Patented Dec. 27, 1938

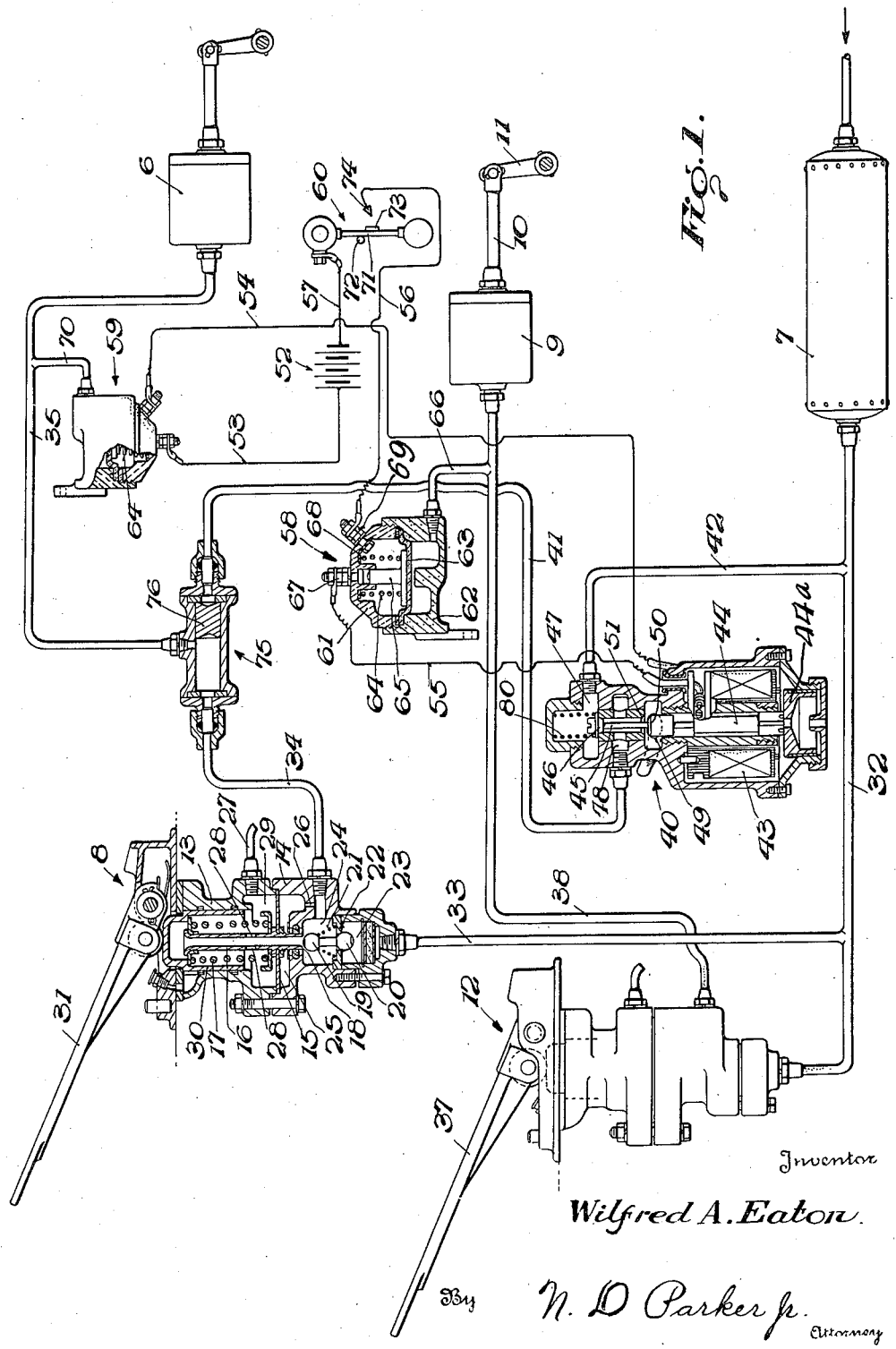

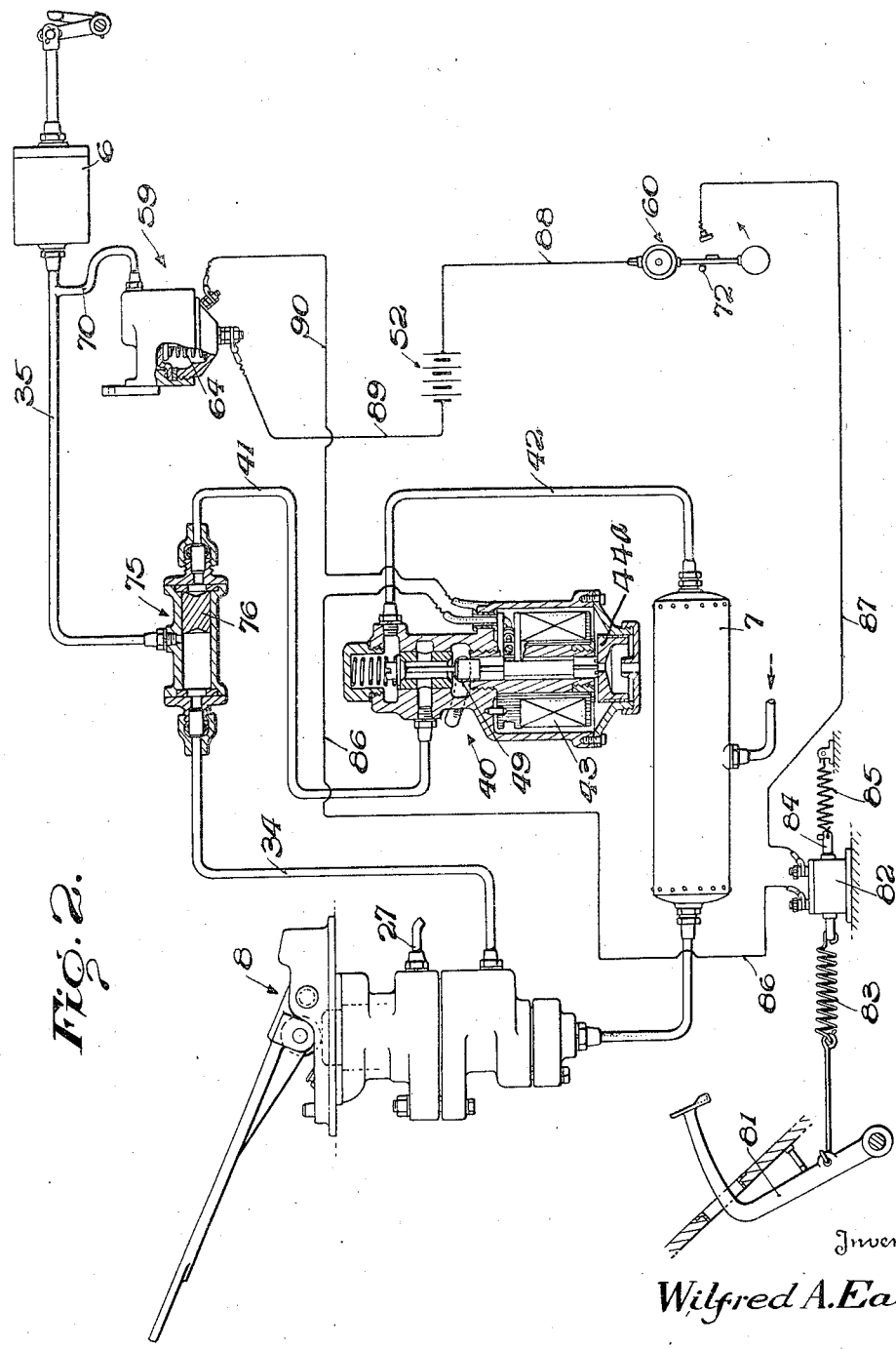

2,141,689

UNITED STATES PATENT OFFICE 2,141,689

VEHICLE CONTROL MECHANISM

Wilfred A. Eaton, Pittsburgh, Pa., assignor to Bendix-Westinghouse Automotive Air Brake Company, Pittsburgh, Pa., a corporation of Delaware Application May 27, 1937, Serial No. 145,138

18 Claims. (Cl. 192—13)

This invention relates to a motor vehicle-controlling mechanism and more particularly to a construction for interrelating the clutch and brake systems.

One of the objects of the invention is to provide a novel automatically-operable mechanism for holding the brakes of a vehicle applied, when the vehicle has been arrested on a slight upward incline.

Another object is to provide, in a mechanism of the above character, a novel interlock between the brake and clutch systems of a motor vehicle, whereby the brakes may be held applied by manipulation of the clutch control pedal.

Still another object is to provide a novel transfer valve mechanism for interconnecting the brake and clutch systems so that the brakes, under certain conditions of vehicle operation, may be supplied with fluid pressure from the clutch system, thereby permitting the operator to use one foot for manipulation of the accelerator for efficient starting of the vehicle.

A further object is to provide a structure of the above character wherein the transfer valve mechanism may be electrically controlled in response to desired operations of the clutch and brake systems.

Other objects and novel features of the invention will appear more fully hereinafter from the following detailed description when taken in connection with the accompanying drawings, wherein two embodiments of the invention are illustrated. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 1 is a diagrammatic view, partly in section, of a motor vehicle control system constructed in accordance with the principles of the present invention, and Fig. 2 is a diagrammatic view, partly in section, of a slightly modified form of the invention wherein the vehicle clutch is manually operated.

Referring more particularly to Fig. 1, a motor vehicle control system constructed in accordance with the principles of the present invention is disclosed therein as including a fluid pressure braking system having a fluid pressure-operated brake chamber 6 adapted to be supplied with fluid pressure from a reservoir 7 under the control of a manually-operable brake valve 8. Associated with the control system is a fluid-operated clutch motor 9 having a movable element 10 connected to the vehicle clutch as by means of any suitable connection, such as link 11, the clutch motor being adapted to be supplied with fluid pressure from reservoir 7 by operation of a clutch-controlling valve 12 positioned adjacent the brake valve 8. Since the valves 8 and 12 are of identical construction, one only will be described in detail.

Referring to valve 8, the same is of the self-lapping type and includes a pair of casing sections 13 and 14 between which a pressure-responsive diaphragm 15 is positioned. The latter carries a valve-operating assembly constituted by a hollow stem 16 between the upper end of which and diaphragm 15 is located a precompressed spring 17. The lower end of the stem 16 is formed with an exhaust valve seat 18 normally spaced from but adapted to contact an exhaust valve 19, the latter being integrally connected with an intake valve 20. Valves 19 and 20 comprise a unitary structure adapted to be normally maintained in the position shown by means of a spring 21, the normal position of the valves being such that the intake valve 20 contacts a valve seat 22, thus cutting off communication between an intake chamber 23 and an outlet chamber 24. As shown, fluid pressure from the latter chamber is conducted to a diaphragm chamber 25 through a restricted choke 26, this construction being provided in order that the pressure build-up in the diaphragm chamber 25 will be relatively slow. In the normal position of the valve, the outlet chamber 24 is connected with exhaust opening 27 through ports 28 positioned in the wall of the stem 16, such ports being in constant communication with an exhaust chamber 29.

A cap 30 slidably mounted in the upper casing section 13 cooperates with the valve in order to move the valve-actuating assembly constituted by spring 17, stem 16 and diaphragm 15 downwardly, for the purpose of controlling the flow of fluid pressure from the intake chamber 23 to the outlet chamber 24. Any suitable actuating mechanism, such as pedal 31, may be provided for actuating the cap 30.

It will be readily understood from the above that, during initial actuation of the pedal 31, the stem 16 is moved downwardly to contact exhaust valve 19 and open the intake valve 20. Fluid pressure thereupon is conducted from reservoir 7 to the intake chamber 23 by way of conduits 32 and 33 and thence to the outlet chamber 24 which is connected to the brake chamber 6 by way of conduits 34 and 35. The build-up of pressure in the brake chamber 6 will be relatively rapid, upon operation of the valve 8, due to the relatively slow build-up of pressure within the diaphragm chamber 25, which, as heretofore stated, communicates with the outlet chamber 24 by way of the restricted passage 26. However, as soon as the pressure build-up in chamber 25 balances the initial pressure upon pedal 31 and the precompression of spring 17, the diaphragm 15 will be moved upwardly a sufficient amount to permit valve 20 to close. The valve in this position will be lapped and will maintain a predetermined pressure in the brake chamber 6. Further increments of movement of the pedal 31 will serve to build up the pressure in brake chamber 6 by proportionate amounts, it being noted that the construction is such that maximum depression of the pedal 31 will serve to maintain intake valve 20 open in order to permit full reservoir pressure to be conducted to the braking system.

For the purpose of controlling the application of fluid pressure to the clutch motor 9, in order to graduate the disengaging and engaging movements of the vehicle clutch, it has heretofore been stated that the valve 12, similar to the brake valve 8, is provided. This valve includes an operating pedal 37, conveniently positioned adjacent the brake valve 8 in a well-known manner. In operation, the clutch valve 12 serves to control the application and release of fluid pressure to and from the clutch motor by way of conduits 32 and 38.

The fluid pressure braking and clutch control systems described above have heretofore been separately and independently operated by manipulation of their respective control valves. By the present invention, these two systems are so interrelated that, under certain conditions, operation of the clutch-controlling valve will not only enable control of the vehicle clutch in the usual manner, but will also serve to supply fluid pressure to the brake chamber 6. Such an arrangement is highly desirable since it relieves the operator of the necessity of maintaining his foot upon the brake valve prior to starting the vehicle in first gear, after the motion of the vehicle has been arrested in traffic, for example.

In order to accomplish the foregoing, the fluid pressure brake and clutch systems are interrelated by a transfer valve mechanism 40 associated with the braking system by conduit 41 and with the reservoir by conduit 42. As shown, the valve mechanism 40 is electrically operated as by means of an electromagnet 43. This magnet when energized draws the armature 44a and the attached stem 44 upwardly, the upper end of the latter being adapted to contact and move valve 45 to such a position that communication is established between conduits 42 and 41. More particularly, the valve 45 includes an intake valve 46 which in the position shown obstructs the flow of fluid from intake chamber 47 to outlet chamber 48. Fluid pressure from the outlet chamber 48 is conducted to an exhaust opening 49 when the armature 44a is in the lowered position, it being pointed out, that when the latter is moved upwardly, the upper end 50 of the stem performs the function of an exhaust valve in cooperation with seat 51. The stem of valve 45 is fluted in order that fluid pressure may readily pass from chambers 47 to 48 when valve 46 is opened and from chamber 48 to exhaust opening 49 when exhaust valve 50 is opened.

Means are provided for controlling the energization of the electromagnet 43 to the end that fluid pressure will be conducted from reservoir 7 past valve 45 to the braking system under certain conditions of operation of the control system. As shown, such means are dependent upon the energization of the vehicle clutch as well as energization of the brake chamber 6 by operation of the brake valve 8. More particularly, the electrical circuit controlling the electromagnetically-operated transfer valve 40 includes a battery 52 connected in series with the electromagnet 43 as by means of conductors 53, 54, 55, 56 and 57 together with pressure-responsive switch devices 58 and 59 as well as a gravity-operated switch 60. Closure of the switches 58, 59 and 60 will thus energize the electromagnet 43 and operate the transfer valve mechanism 40 in the manner heretofore described.

The pressure-responsive switch devices 58 and 59 are identical in construction, and hence it is believed necessary to describe only one in detail. Referring, therefore, to switch device 58, the same is constituted by a housing including an insulated upper portion 61 and a lower portion 62, these portions having clamped therebetween a pressure-responsive element in the form of a diaphragm 63. Resting upon said diaphragm and resiliently urged downwardly, as viewed in Fig. 1, as by means of a spring 64, is a contact member 65 which, when moved upwardly in response to fluid pressure in conduit 66, is adapted to be electrically connected with terminal 67. Since spring 64 is in engagement with a plate 68 connected to terminal 69, when the aforementioned contact between members 65 and 67 is effected, it will be understood that a circuit is completed between conductors 55 and 56. The completion of this circuit is of course dependent upon the existence of fluid pressure in the vehicle clutch system.

The pressure-responsive switch device 59 is responsive to the pressure existing in the braking system, such pressure being conducted to device 59 through conduit 70. Preferably, the spring 64 of device 59 is preloaded to such an extent that substantially maximum braking pressure must be present in conduit 70 before device 59 operates to complete a circuit through conductors 53 and 54.

With respect to the gravity-operated switch device 60, such device includes a weighted arm 71 normally in engagement with stop 72 when the vehicle is level. However, in the event that the vehicle is on a slight upgrade, arm 71 will swing in a counterclockwise direction and complete the circuit through conductors 56 and 57 by means of cooperating contacts 73 and 74. It will be understood that the gravity-controlled switch 60 is provided for the purpose of preventing operation of the transfer valve mechanism 40 except when the vehicle is on a slight upward incline. If it is desired that the transfer valve operate irrespective of the inclination of the vehicle, switch 60 may be eliminated, in which event conductors 56 and 57 are connected together.

In order to permit fluid pressure to be conducted to the braking conduit 35 from either of the conduits 34 or 41 associated respectively with the brake valve 8 and transfer valve 40, a double check valve 75 is interposed at the junction of said conduits. This valve includes a slidable element 76 which is moved to one extreme position or the other in accordance with a preponderance of fluid pressure existing either in conduit 34 or conduit 41.

From the foregoing, it will be readily apparent that, in the event the operator finds it necessary to stop the vehicle in traffic, it is necessary only that he depress the brake and clutch valves 8 and 12 in the usual manner, thus effecting an application of the vehicle brakes as well as a disengagement of the vehicle clutch. Provided the vehicle is on a slight upgrade, switch 60 will be closed, thus establishing an electrical circuit between conductors 56 and 57. An electrical circuit will also be completed between conductors 53 and 54 upon closure of the switch device 59 as soon as substantially maximum braking pressure has been admitted to conduit 35 by operation of the brake valve. Switch device 58 will be closed in response to the pressure existing in the clutch conduit 38 and hence the circuit to the electromagnet 43 will be completed in order to actuate the transfer valve 40. At this stage of the operation, armature 44 moves upwardly to unseat the intake valve 46, thus conducting fluid pressure from the reservoir 7 to conduit 41 by way of conduit 42, chamber 47, valve 46 and chamber 48. The double check valve 75 will under these conditions remain in the position shown wherein fluid pressure is supplied to the brake chamber 6 through brake conduit 34. However, as soon as the pressure in conduit 34 is reduced, due to the operator's removing his foot from the brake valve 8, the valve element 76 of the double check valve will shift to the left in view of the greater pressure existing in conduit 41. Such pressure will thereupon be conducted to conduit 35 and will maintain the switch device 59 energized so long as the operator maintains his foot upon the clutch valve 12. Thus it will be seen that the vehicle brakes will be held in applied position and the clutch disengaged by the operation of the clutch valve.

When it is desired to again start the vehicle in gear, it is necessary only to release the clutch valve 12 which effects not only a release of the vehicle brakes but also a graduated engagement of the vehicle clutch. This will be readily understood when it is considered that, as soon as the pressure is released in the clutch conduit 38, and hence brake conduit 35, a relatively slight amount, the spring 64 of switch device 59 will effect deenergization of the latter and a consequent interruption of the series circuit energizing electromagnet 43. The transfer valve 40 will thus be moved to exhaust position under the influence of a spring 80 associated with the valve 45 and preferably this release of fluid pressure from the braking system takes place prior to reengagement of the vehicle clutch. Consequently, the remaining graduation of pressure release in conduit 38 and clutch motor 9 through subsequent operation of clutch valve 12 will serve to graduate the engagement of the clutch and enable efficient starting of the vehicle in gear. Thus, with the above described arrangement, the vehicle may be held in braked position by means of operation of the clutch valve alone and may be started in gear without the possibility of any backward movement of the vehicle when it is desired to move the same forwardly.

Referring more particularly to Fig. 2, the invention illustrated therein is similar to that shown in Fig. 1 with the exception that a manually-operated clutch is disclosed in lieu of a pressure-operated clutch. As shown, the vehicle clutch is controlled by a pedal 81, the latter being connected to a switch 82 by means of a resilient connection 83. The switch 82 includes a movable switch element 84, and, in the position illustrated, a spring 85 serves to maintain the switch 82 in open position. The construction is such, however, that, after sufficient movement of pedal 81 has taken place to effect complete disengagement of the vehicle clutch, switch element 84 is moved to a position where the circuit through switch 82 is completed. Closure of switch 82 serves to connect conductors 86 and 87 associated respectively with the electromagnet 43 and gravity-operated switch 60. The latter is connected to battery 52 through conductor 88 while the remainder of the circuit includes conductors 89, 90 and the pressure-operated switch device 59 subjected to the pressure in the braking conduit 35 through conduit 70. As in the case of Fig. 1, the spring 64 of switch device 59 is preloaded in such a manner that the circuit through said device is completed only when substantially maximum braking pressure exists in the conduit 35.

In the operation of the foregoing arrangement, it will be understood that, upon simultaneous depression of the brake valve 8 and pedal 81, the brakes will be applied in the manner heretofore described in connection with Fig. 1, and the vehicle clutch disengaged. In the event that the vehicle is on a slight upward incline, switch 60 will complete the connection between conductors 87 and 88. As soon as substantially maximum braking pressure exists in the braking conduit 35, the switch device 59 will complete the series circuit to the electromagnet 43, hence operating the transfer valve mechanism to supply fluid pressure from reservoir 7 to the double check valve 75 through conduits 42 and 41. Here again, as soon as the operator begins to relieve pressure in the brake conduit 34, through exhausting of the brake valve 8, the double check valve 75 will operate to connect conduits 41 and 35, and fluid pressure from reservoir 7 will be conducted not only to the brake chamber 6 but also to switch device 59 in order to maintain the latter energized. When the operator desires to start the vehicle, it is necessary only to relieve pressure from the pedal 81 which permits switch 82 to open prior to initiation of clutch engagement. Opening of the switch 82 deenergizes electromagnet 43 and the braking system thus exhausts through the exhaust port 49 of the transfer valve. Subsequent return movement of the pedal 81 effects engagement of the clutch, and, during this time, the operator's right foot will be free to operate the vehicle accelerator and thus efficiently start the vehicle in gear.

While the two embodiments of the invention illustrated in the drawings have been described with considerable particularity, it is to be understood that the invention is not restricted thereto as the same is capable of receiving a variety of expressions, some of which will now readily suggest themselves to those skilled in the art, while changes may be made in the details of construction, arrangement and proportion of parts, and certain features used without other features, without departing from the spirit of this invention. Reference is, therefore, to be had to the claims hereto appended for a definition of the limits of the invention.

What is claimed is:

1. In a motor vehicle provided with a fluid pressure braking system and a clutch device, a source of fluid pressure, a brake chamber, a fluid pressure-operated clutch motor, means including a brake valve for connecting said source and chamber to apply the brake in service, means including a separate valve for connecting said source and motor to operate said clutch device, and means including an electrically-operable device for connecting the brake chamber with said source independently of the brake valve.

2. In a motor vehicle provided with a fluid pressure braking system and a clutch device, a source of fluid pressure, a brake chamber, a fluid pressure-operated clutch motor, means including a brake valve for connecting said source and chamber to apply the brake in service, means including a separate valve for connecting said source and motor to operate said clutch device, electrically-operable means for connecting said brake chamber with said source independently of the brake valve, and means including a mechanism dependent upon pressure supplied the clutch motor for controlling said electrically-operable means.

3. In a motor vehicle provided with a fluid pressure braking system and a clutch device, a source of fluid pressure, a brake chamber, a fluid pressure-operated clutch motor, means including a brake valve for connecting said source and chamber to apply the brake in service, means including a separate valve for connecting said source and motor to operate said clutch device, and means for maintaining the brakes applied upon actuation of said separate valve including a connection between the brake chamber and source together with electrically-operable means controlled by fluid pressure supplied said brake chamber and clutch motor upon operation of said valves for controlling said connection.

4. In a motor vehicle provided with a fluid braking system and a clutch device, a source of fluid pressure, a brake chamber, a clutch motor, a brake valve for controlling the application of fluid pressure from said source to said chamber, a clutch valve for controlling the flow of fluid pressure from said source to the motor, means for connecting the source and chamber independently of the brake valve including a valve mechanism movable to open position, and electrical connections for maintaining said valve mechanism open irrespective of movement of the brake valve to exhaust position.

5. In a motor vehicle provided with a fluid braking system and a clutch device, a source of fluid pressure, a brake chamber, a brake valve for supplying fluid pressure from said source to said chamber, and means operable to connect said source and brake chamber upon energization of said clutch device including an electric switch mechanism responsive to the pressure of the fluid supplied to the brake chamber by operation of the brake valve.

6. In a motor vehicle provided with a fluid braking system and a clutch device, a source of fluid pressure, a brake chamber, a brake valve for supplying fluid pressure from said source to said chamber, and means operable to connect said source and brake chamber upon energization of said clutch device including an electrically-operated valve mechanism movable to open position in accordance with the pressure of the fluid supplied to the brake chamber upon operation of the brake valve.

7. In a motor vehicle provided with a fluid braking system and a clutch device, a source of fluid pressure, a brake chamber, a brake valve for supplying fluid pressure from said source to said chamber, means operable to connect said source and brake chamber upon energization of said clutch device including an electrically-operated valve mechanism movable to open position in accordance with the pressure of the fluid supplied to the brake chamber upon operation of the brake valve, and connections for maintaining said valve mechanism open irrespective of movement of the brake valve to exhaust position.

8. In a motor vehicle provided with a fluid braking system and a clutch device, a source of fluid pressure, a brake chamber, a brake valve for supplying fluid pressure from said source to said brake chamber, and means for maintaining said brake chamber energized irrespective of movement of the brake valve to exhaust position including an electrically-operable valve mechanism controlled by energization of said clutch device.

9. In a motor vehicle provided with a fluid braking system and a clutch device, a source of fluid pressure, a brake chamber, a brake valve for supplying fluid pressure from said source to said brake chamber, and means for maintaining said brake chamber energized irrespective of movement of the brake valve to exhaust position including an electrically-operable valve mechanism together with switch means controlled by energization of said clutch device.

10. In a motor vehicle provided with a fluid braking system and a clutch device, a source of fluid pressure, a brake chamber, a brake valve for supplying fluid pressure from said source to said brake chamber, a fluid pressure connection between said source and brake chamber independent of the brake valve, an electromagnetically-controlled valve in said connection, and means dependent upon energization of said clutch device and upon the pressure of the fluid supplied the brake chamber upon operation of the brake valve for energizing said electromagnetically-controlled valve.

11. In a motor vehicle provided with a fluid braking system and a clutch device, a source of fluid pressure, a brake chamber, a brake valve for supplying fluid pressure from said source to said brake chamber, a fluid pressure connection between said source and brake chamber independent of the brake valve, an electromagnetically-controlled valve in said connection, and means for energizing said last named valve including an electrical circuit having a pressure-operated switch associated with the fluid braking system.

12. In a motor vehicle provided with a fluid braking system and a clutch device, a source of fluid pressure, a brake chamber, a brake valve for supplying fluid pressure from said source to said brake chamber, a fluid pressure connection between said source and brake chamber independent of the brake valve, an electromagnetically-controlled valve in said connection, and means for energizing said last named valve including an electrical circuit having a switch associated with said clutch device for closure during operation of the latter.

13. In a motor vehicle provided with a fluid braking system and a clutch device, a source of fluid pressure, a brake chamber, a brake valve for supplying fluid pressure from said source to said brake chamber, a fluid pressure connection between said source and brake chamber independent of the brake valve, an electromagnetically-controlled valve in said connection, and means for energizing said last named valve including an electrical circuit having a gravity-controlled switch therein.

14. In a motor vehicle provided with a fluid braking system and a clutch device, a source of fluid pressure, a brake chamber, a brake valve for supplying fluid pressure from said source to said brake chamber, a fluid pressure connection between said source and brake chamber independent of the brake valve, an electromagnetically-controlled valve in said connection, and means for energizing said last named valve including an electrical circuit having a pressure-operated switch associated with the fluid braking system, a gravity-controlled switch, and a switch controlled by energization of the clutch device.

15. In a motor vehicle provided with a fluid braking system and a clutch device, a source of fluid pressure, a brake chamber, a brake valve for supplying fluid pressure from said source to said brake chamber, a fluid pressure connection between said source and brake chamber independent of the brake valve, an electromagnetically-controlled valve in said connection, means dependent upon energization of said clutch device and upon the pressure of the fluid supplied the brake chamber upon operation of the brake valve for energizing said electromagnetically-controlled valve, and pressure-controlled means operative to connect said brake chamber and connection when the brake valve is moved to exhaust position.

16. In a motor vehicle provided with a fluid pressure braking system and a clutch device, a source of fluid pressure, a brake chamber, a fluid pressure-operated clutch motor, means including a brake valve for connecting said source and chamber to apply the brake in service, means including a separate valve for connecting said source and motor to operate said clutch device, and means including an electrically-operable device for connecting the brake chamber with said source independently of the brake valve, said last named means being effective to connect said source and brake chamber only when the brake valve is moved to exhaust position.

17. In a motor vehicle provided with a fluid pressure braking system and a clutch device, a source of fluid pressure, a brake chamber, a brake valve connected with said source, a conduit connecting the brake valve with said chamber, means for operating said clutch device, a second conduit connecting said first conduit and source independently of the brake valve, electromagnetically-controlled valve means in said second conduit, means for operating said valve means including a switch controlled by said clutch-operating means, and a pressure-responsive valve positioned at the connection between said first and second conduits for controlling the flow of fluid pressure to said brake chamber from the brake valve or the second conduit.

18. In a motor vehicle provided with a fluid braking system and a clutch device, a source of fluid pressure, a brake chamber, a brake valve for supplying fluid pressure from said source to said brake chamber, a fluid pressure connection between said source and brake chamber independent of the brake valve, an electromagnetically-controlled valve in said connection, and means for energizing said last named valve including an electrical circuit having a pressure-operated switch associated with the fluid braking system, a switch controlled by energization of the clutch device, and a switch controlled independently of the braking system and clutch device.

WILFRED A. EATON.